United States Patent
Heise

[11] Patent Number: 5,860,180
[45] Date of Patent: Jan. 19, 1999

[54] TIRE CLEANING APPARATUS FOR WHEELCHAIRS

[75] Inventor: Thorsten Heise, Weisbaden, Germany

[73] Assignee: Rudiger Heise, Berlin, Germany

[21] Appl. No.: 702,654

[22] PCT Filed: Mar. 3, 1995

[86] PCT No.: PCT/DE95/00314

§ 371 Date: Feb. 5, 1997

§ 102(e) Date: Feb. 5, 1997

[87] PCT Pub. No.: WO95/23715

PCT Pub. Date: Sep. 8, 1995

[30]    Foreign Application Priority Data

Mar. 5, 1994 [DE] Germany ............................ 44 07 412.3
Sep. 23, 1994 [DE] Germany ............................ 94 15 423 U

[51] Int. Cl.$^6$ ........................................................ B60S 3/06
[52] U.S. Cl. ............................ 015/88.2; 15/88.3; 15/53.4
[58] Field of Search .................................. 15/53.4, 88.2, 15/88.3, DIG. 2

[56]    References Cited

U.S. PATENT DOCUMENTS

| 1,479,841 | 1/1924 | Stover | 15/DIG. 2 |
| 3,729,763 | 5/1973 | Coley | 15/53.4 |
| 4,233,703 | 11/1980 | Clyne et al. | 15/53.4 |

FOREIGN PATENT DOCUMENTS

| 480209 | 12/1969 | Switzerland | 15/DIG. 2 |
| 1227497 | 4/1986 | U.S.S.R. | 15/53.4 |

*Primary Examiner*—Terrence Till

[57]    ABSTRACT

So that in a tire cleaning apparatus for wheelchairs the tires of wheelchairs can be quickly and reliably cleaned without outside help, there is provided a cleaning apparatus which has at least two rollers which carry the wheelchair tires with the wheelchair, wherein at least one roller is drivable for rotating the tires or is switchable into a freewheel condition, and at least one cleaning device associated with at least one tire.

18 Claims, 5 Drawing Sheets

TIRE CLEANING APPARATUS FOR WHEELCHAIRS

BACKGROUND OF THE INVENTION

1. Field of the Invention

The invention concerns a tire cleaning apparatus for wheelchairs.

Wheelchairs are generally used by handicapped people and have to replace or at least temporarily relieve the strain on the functioning of the walking equipment, both inside and outside buildings. Unlike the situation in relation to people who are not handicapped, when entering a building the wheelchair cannot be simply changed like a normal pair of shoes but, if the tires are dirty, it has to be cleaned and also further used within the building. For removing in particular large-size soiling hitherto cleaning cloths or brushes were used, which were passed around the entire periphery of the wheel in a time-consuming manner; the handicapped person frequently could not do that without outside help. In addition the dirt which dropped off in the cleaning operation had to be subsequently removed.

2. Description of Related Art

U.S. Pat. No. 5,133,375 shows a cleaning apparatus for wheelchairs which however is only intended for wheelchairs which are pushed by hand. The wheelchair, without the handicapped person, must be introduced into a container by a non-handicapped person. It is also not stated that at least roller (48, 49), see FIG. 7 of U.S. Pat. No. 5,133,375, is to be switched into a free-wheel condition.

SUMMARY OF THE INVENTION

Therefore the object of the present invention is to provide a tire cleaning apparatus with which the tires of wheelchairs can be quickly and reliably cleaned without outside help.

The invention provides a cleaning apparatus for wheelchairs, which has at least two rollers which carry at least one wheelchair tire with wheelchair, wherein at least one roller is drivable for rotating the tires or is switchable into a freewheel condition, and at least one cleaning device associated with at least one tire.

A substantial advantage of the invention is that a handicapped wheelchair occupant enjoys greater freedom as there is no need for people to assist in cleaning the wheelchair tires.

So that the tire cleaning apparatus can be flexibly adapted to wheelchair tires of different diameters, a plurality of rollers are arranged in the platform in pairs with increasing spacings relative to each other in a trough.

As there are both manually and also electrically driven wheelchairs, it is desirable that each roller can be selectively drivable or switched into a freewheel condition.

So that the wheelchair is not driven out of the tire cleaning apparatus when that is not wanted, oppositely disposed rollers can rotate at different speeds in order to produce a vertical force component which is directed towards the platform. In that manner wheelchairs are securely held in the tire cleaning apparatus.

In a first embodiment one of the cleaning devices is desirably a cleaning belt which is rotatable in opposite relationship to the direction of rotation of the rollers and which contacts the tire from below. So that the cleaning operation is more efficient and the apparatus is more adaptable the cleaning belt comprises a plurality of brush segments which are mounted movably on a drive chain, wherein the brush segments are preferably of elliptical cross-section and rotate about an axis of rotation which is perpendicular to the roller axis.

So that dirt can be reliably removed from the whole of the peripheral surface of the tire, three cleaning devices can be associated with each tire, which devices are arranged along the roller axis at a spacing relative to each other and displaced in respect of height in such a way that the respective two outwardly disposed cleaning devices are in a plane which is higher than that of the central cleaning device.

So that the brush segments can clean themselves, at least two of the cleaning devices are so arranged that the brush segments partially overlap in the inoperative condition at least when rotating.

So that the cleaning devices can be adapted to different tire thicknesses in the first embodiment the cleaning devices can be suitably displaced relative to each other.

In a second embodiment the cleaning device includes a first round brush which rotates substantially in the opposite direction to the tire and which can reliably clean profile portions of the wheelchair tire, which extend in the rolling direction.

Constructing that first round brush from a plurality of disc-shaped brush segments permits flexible exchange of the disc-shaped brush segments and simplifies maintenance thereof.

Further second round brushes which are mounted rotatably in such a way that rotation thereof leads to a cleaning effect in the side wall region and/or the lower drain-off region of the wheelchair tire clean transversely extending profile portions of the wheelchair tire and the side walls thereof.

With a plurality of second round brushes which are arranged in a row in side-by-side relationship and which rotate substantially perpendicularly to the first round brush, it is possible to forgo adjustment in relation to the wheelchair tire width. Completely covering a width which goes beyond the known wheelchair widths makes the apparatus flexibly suitable for use for any type of wheelchair.

Switching the tire cleaning apparatus on and off and operating the same can be effected by way of an operating console which can be reached from a wheelchair.

So that the location where the tire cleaning apparatus is used is not unnecessarily soiled, a removable catch trough is arranged beneath the cleaning devices.

BRIEF DESCRIPTION OF THE DRAWINGS

The invention is described in greater detail hereinafter with reference to the accompanying drawings in which.

DESCRIPTION OF PREFERRED EMBODIMENTS

Figure 1:
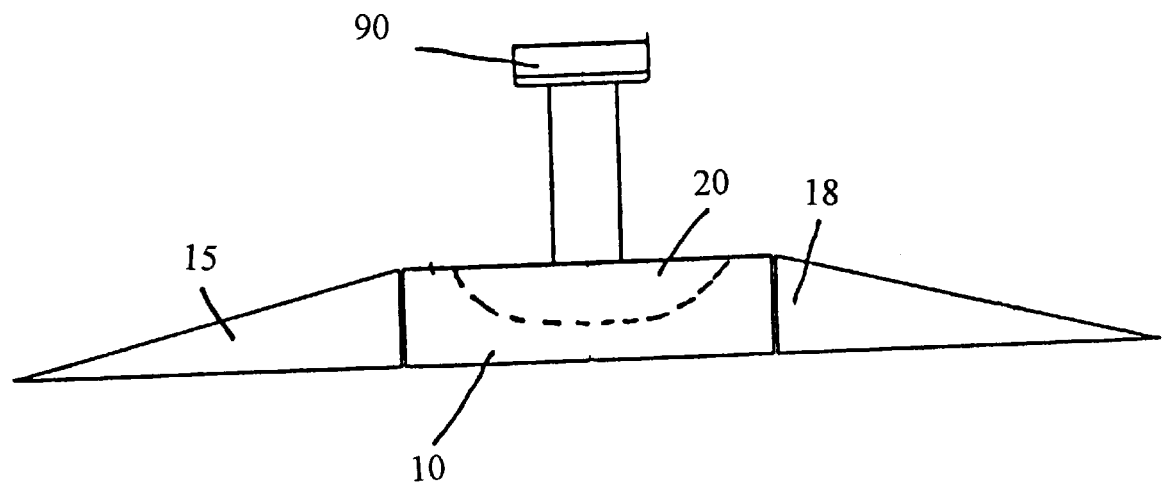
FIG. 1 is a side view of the platform, provided with a trough, of a first embodiment of the tire cleaning apparatus according to the invention.

FIG. 1 shows a side view of a platform 10 of a first embodiment according to the invention of the tire cleaning apparatus. Two approach or run-on ramps 15 and 18 delimit the platform 10. The two ramps 15 and 18 have an angle of inclination of about 8° which is so selected that a wheelchair which is moving onto the platform 10 cannot tip rearwardly. Provided in the platform 10 is a trough 20 which extends transversely to the direction of travel of a wheelchair onto the platform, for receiving wheelchair tires 30. Advantageously the trough 20 extends over almost the entire width of the platform 10. The trough 20 which is preferably of a rectangular configuration is laterally delimited by the upper edge of the platform 10 in order thus to prevent the wheelchair from moving out laterally during the cleaning operation. Instead of a continuous trough 20 it is also possible to provide two separate troughs in the platform 10, which are arranged at a spacing corresponding to the spacing of the wheelchair tires or wheels 30.

For example six rollers 40, 50 are arranged in the trough 20. Each two rollers or rolls are disposed in a horizontal plane, the spacing between the rollers 40, 50 of a pair increasing with increasing spacing relative to the platform 10. The rollers 40, 50 are thus arranged over the periphery of a notional segment of a circle. In that way it is possible for tires 30 of different diameters to be received in the trough 20 (see FIG. 2). The rollers 40, 50 extend over the entire width of the trough 20. Alternatively however they may also be of a multi-part configuration and shorter and individually associated with each tire 30. Each roller or roll 40, 50 is driven in known manner, preferably by controlled dc motors.

So that the tire cleaning apparatus can be used both for electrically driven wheelchairs and also for wheelchairs which are pushed by hand, each roller 40, 50 can be operated in a freewheel mode, that is to say the dc motors are switched off by switches (not shown) or are in the idle condition. In order to ensure that the wheelchair cannot be urged out of the trough 20 during the cleaning operation, oppositely disposed rollers 40, 50 can be driven at different speeds or with different torques in order thus to produce a vertical force component which is directed towards the platform 10. In that way the wheelchair is drawn in the direction of the platform 10 and is held fast in the trough 20.

Figure 2:
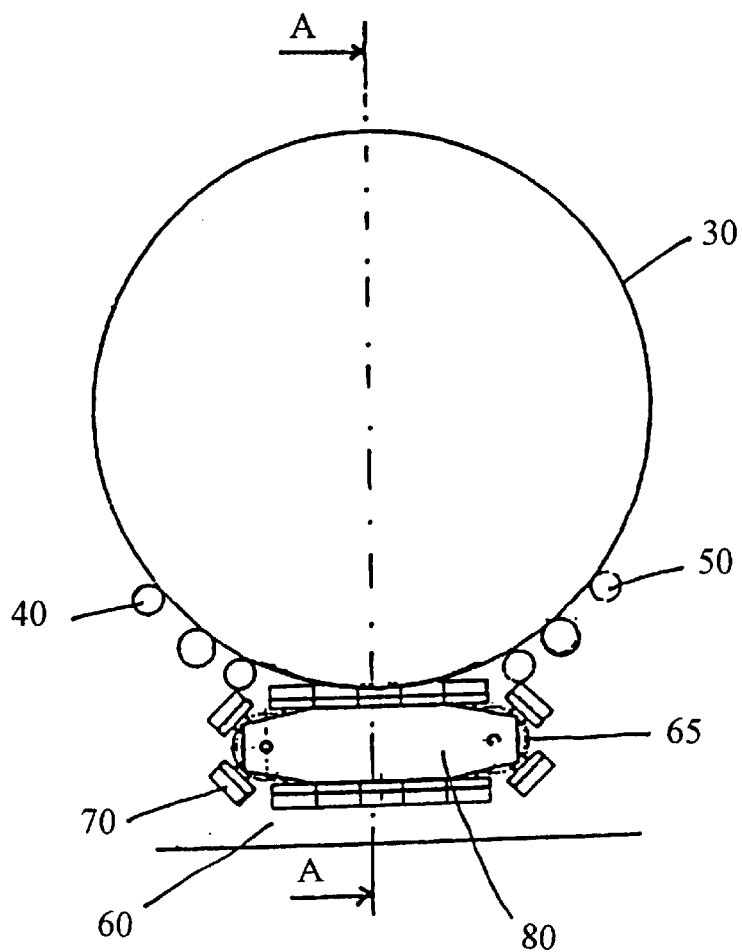
FIG. 2 is a side view of a wheelchair tire which is moved by means of six drive rollers, together with a cleaning device in accordance with the first embodiment.
Figure 3:
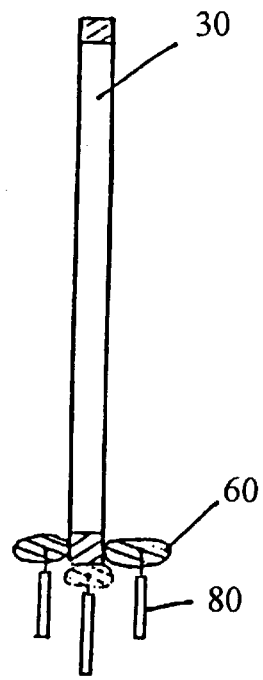
FIG. 3 is a view of a further embodiment of the cleaning device.

FIG. 2 shows a cleaning device 60 of a first embodiment in the form of a cleaning band or belt. The cleaning belt itself is composed of a plurality of brush segments 70 mounted movably on a drive chain 65. The drive chain 65 is driven by way of controlled dc motors, the direction of movement being opposite to the direction of rotation of the rollers 40, 50. As can be seen from FIG. 2 the cleaning device 60 is arranged beneath the drive rollers 40, 50 and touches the tire 30 in the region of the lowermost tangent thereof. The profile of the brush segments 70 is disc-shaped and in particular is of an elliptical cross-section so that the dirt is transported away laterally in the actual cleaning operation. In order to increase the level of efficiency in the cleaning operation each brush segment 70 is rotated by way of a dc motor, the axis of rotation of the brush segments being perpendicular to the roller axis. FIG. 3 shows the portion of a tire cleaning apparatus in which three cleaning devices 60 for cleaning a tire 30 are provided. The cleaning devices 60 are arranged along the axis of the rollers 40, 50 at a spacing relative to each other and displaced in respect of height in such a way that the respective two outwardly disposed cleaning devices 60 are in a horizontal plane which is higher than the plane in which the central device 60 is disposed. That ensures that the entire peripheral surface of the tire can be reached by the brush segments 70. The spacing of the three cleaning devices 60 associated with a tire 30 relative to each other is so selected that the brush segments 70 of each of the three cleaning devices 60 partially overlap in the inoperative condition, that is to say without a wheelchair, at least when the brush segments 70 are rotating. In that way the brush segments 70 clean themselves.

So that the apparatus for cleaning wheelchair tires can be adapted to the different dimensions of tires, there are provided positioning devices (not shown) which can displace the cleaning devices 60 in a vertical and a horizontal direction, independently of each other.

FIG. 2 shows a guide body 80 which is stationary with respect to the brush segments 70. The guide body 80 is of a substantially rectangular cross-sectional shape, whose outer ends are of a frustoconical configuration. The guide body 80 serves to guide the brush segments 70 at least in part, at any event in the working region. The longitudinal axis of the guide body 80 extends parallel to the platform 10. Such a configuration of the cleaning device provides that the brush segments 70 are pressed against the tire 30 to be cleaned.

Actuation of the tire cleaning apparatus is effected by way of an operating console 90 which is shown in FIG. 1. In particular arranged in the platform 10 are sensors which for example detect the dimensions of the wheelchair tire 30. A microprocessor in the operating console 90 responds to the sensor signals and causes the positioning devices to move the cleaning devices 70 to the appropriate positions. By way of the operating console 90 the wheelchair occupant can for example manually preset the cleaning time and switch the cleaning devices 70 and the drive motors for the bush segments 70 on and off. In order to catch the dirt which is loosened from the brush segments 70 a catch trough can be arranged removably in the platform 10 and beneath the cleaning devices 60.

FIGS. 4 to 8 show a second embodiment according to the invention. The main difference in relation to the first embodiment essentially consists of the first round brush 170 which can be seen in FIG. 4 and which is provided instead of the cleaning belt.

The round brush 170 which preferably extends over the entire width and which rotates in the opposite direction to the direction of rotation of the wheelchair tire comprises a plurality of disc-shaped brush segments 171. Because of the width of the round brush 170 adjustment in relation to the respective tire width of the wheelchair is no longer required. The brushes (170, 180) are designed the clean tires of different width.

The brush 170 is drivable by means of a belt drive 175 by the dc motor 179. Both the dc motor 179 and also the first round brush 170 are held on bar-like longitudinal bearers 210 which are connected together by respective transverse bearers 220. As only the left-hand part of the second embodiment of the apparatus according to the invention is shown in FIG. 6 the right-hand longitudinal bearer 210 which except for the fixings of the motors is otherwise of a symmetrical configuration is not shown.

Extending parallel to the first round brush 170 are the rotatably mounted rollers 140, 150 which are driven by the dc motor 230. The rollers 140, 150 comprise rimmed steel rollers and are covered with wear-resistant rubber or plastic material.

In a further manner not shown in the drawings the drive for the rollers 140 includes an additional motor and the rollers 140 are not force-drivingly coupled to the rollers 150. By virtue of that arrangement it is possible to produce different drive torques or speeds which produce the downwardly directed force components that are wanted during the cleaning operation.

Figure 6:
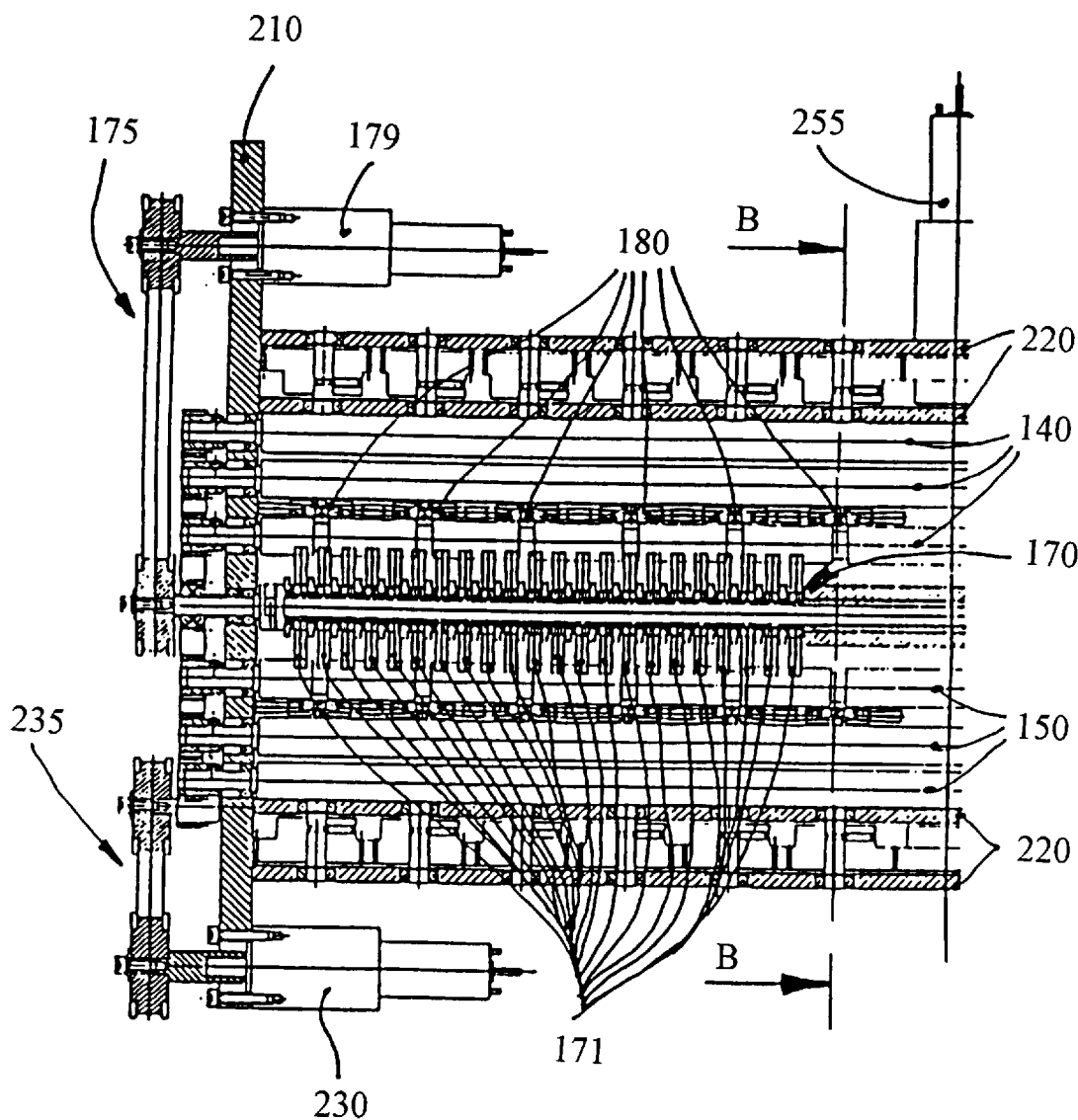
FIG. 6 is a view onto the cleaning apparatus of the second embodiment from above with the side and bottom walls and the cover plates omitted.

In the embodiment illustrated in FIG. 6 the rollers 140, 150 have tooth arrangements at each of their respective left-hand ends and mesh with gears 240 which are respectively arranged between the rollers and which provide for the correct direction of rotation of the respective roller.

Second round brushes 180 are arranged perpendicularly to the first round brush 170. The shaft 185 of the second round brushes 180 is mounted rotatably in the transverse bearer 220. Gears 245 or a toothed belt 250 which is alternatively shown in FIG. 5 transmits the drive torque of the motor 255 to the brushes 180.

When using the toothed belt 250 the slightly overlapping bristle portions 188 of the second round brushes 180 will respectively mesh with each other in opposite relationship and as a result have a self-cleaning action.

The longitudinal bearers 210 are mounted pivotably upwardly on the bottom plate 270 by means of a pivot connection 260.

In the upwardly pivoted position the respective cleaning devices are easily accessible for cleaning and maintenance, and the trough 20 which is then exposed can also be easily cleaned.

Figure 7:
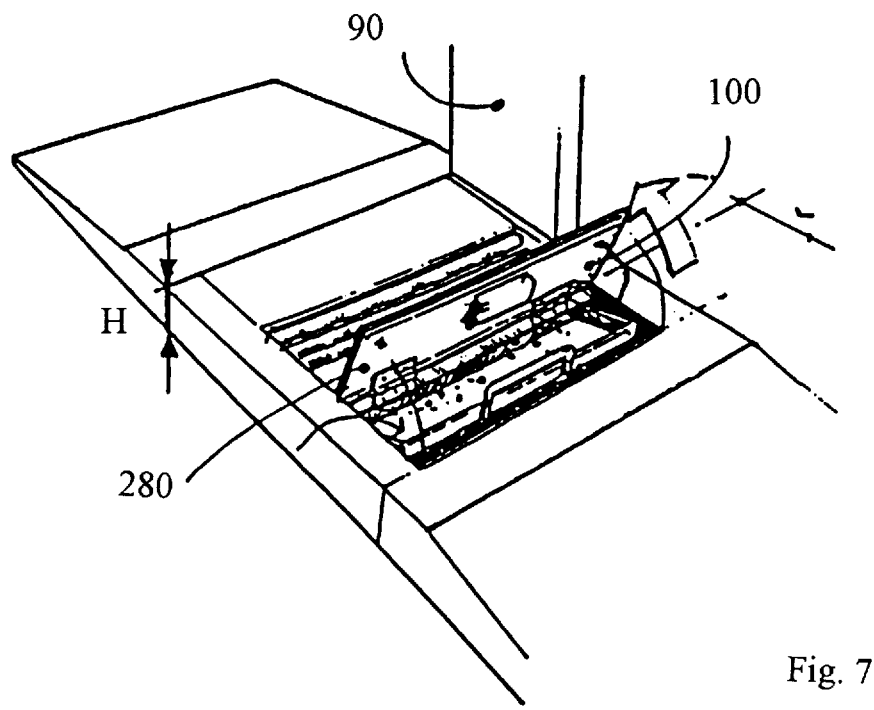
FIGS. 7 and 8 show opening and removal of the removable catch trough.
Figure 8:
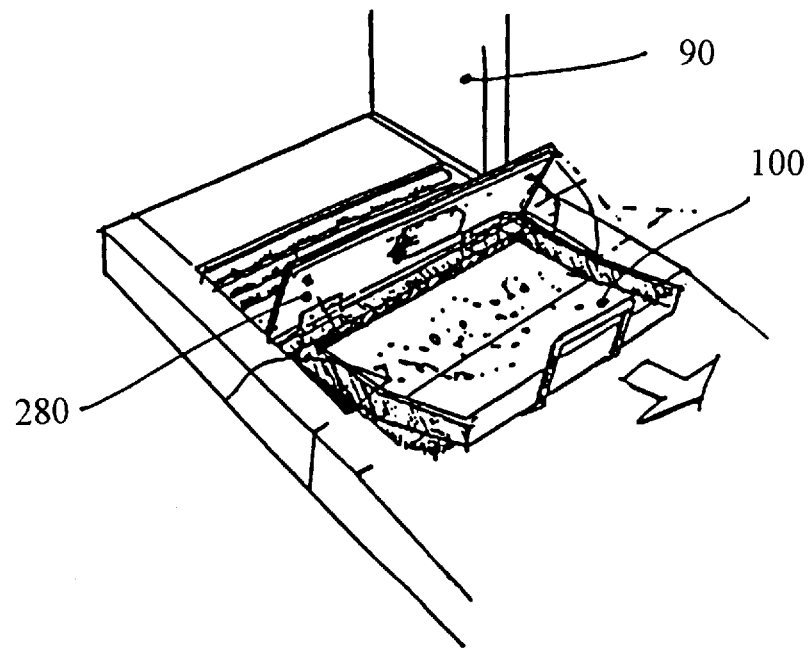

In an alternative embodiment shown in FIGS. 7 and 8 a cover plate 280 is adapted to be pivotable upwardly and permits removal of the catch trough 100.

Control of the cleaning apparatus is provided by a control circuit 200. By means of sensors 190 which are connected to the control circuit and which are arranged both in the entry region of the apparatus and also in the exit region thereof as well as in the central region of the apparatus which serves for the cleaning operation, the location at which a wheelchair stops is detected by the control circuit 200.

Figure 4:
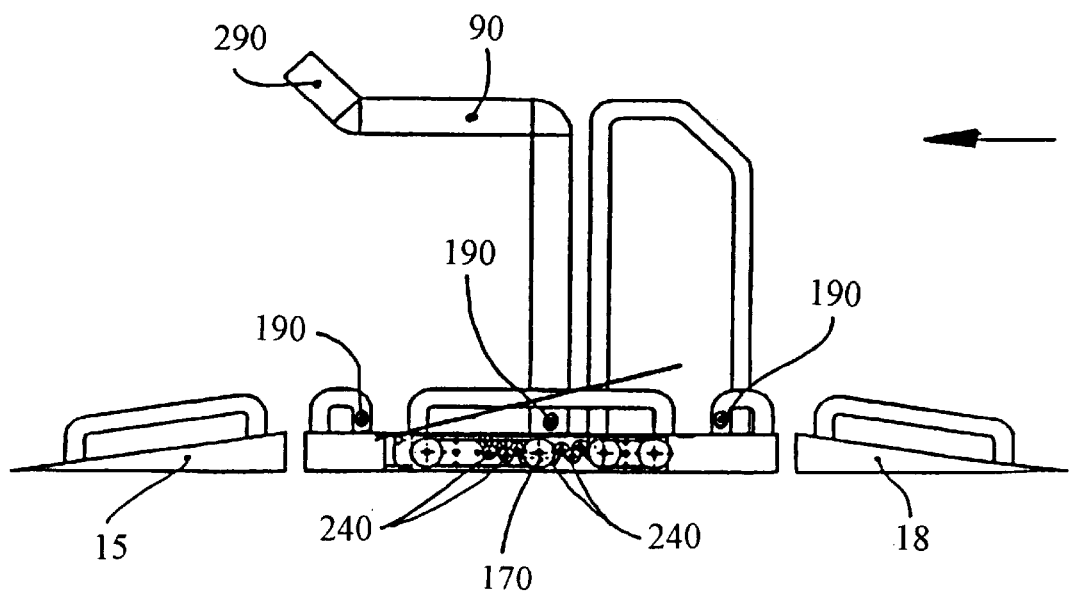
FIG. 4 is a side view in partly broken-away form of the second embodiment of the invention.
Figure 5:
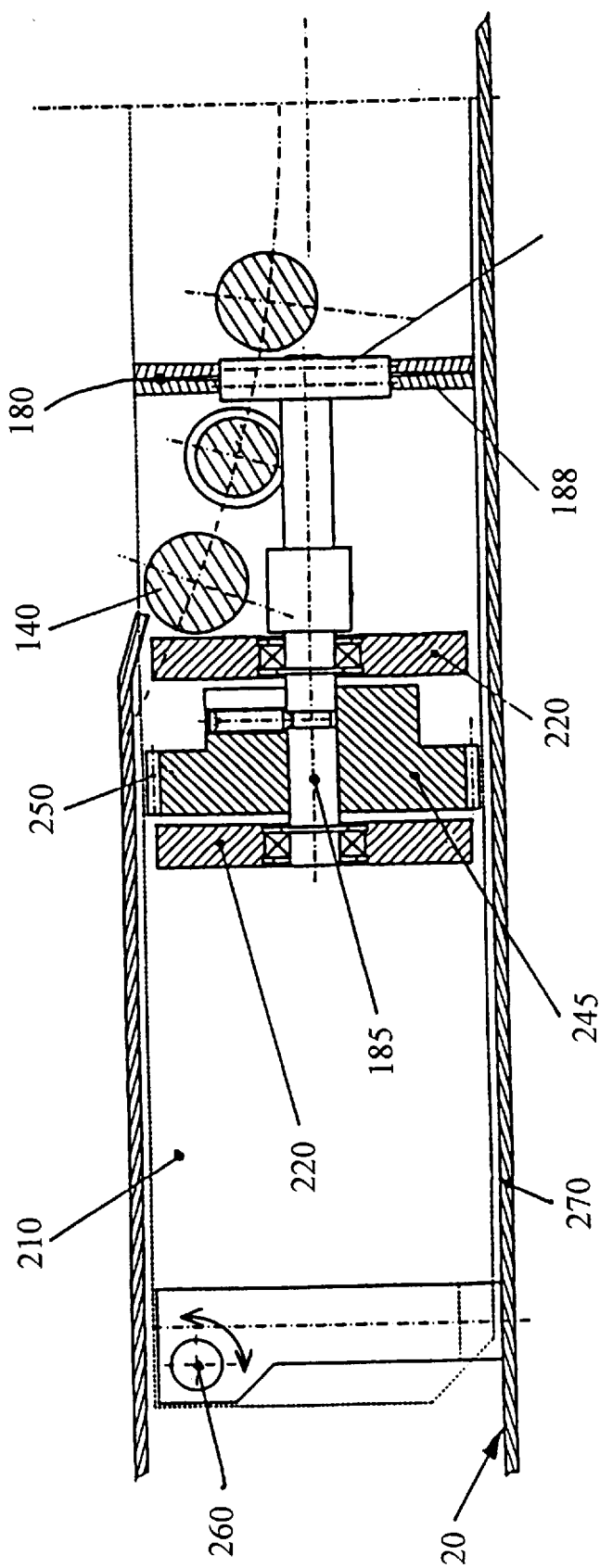
FIG. 5 is a detail on an enlarged scale of the embodiment shown in FIG. 4 along the upper half of the section line B—B but without showing the drive motors.

When the wheelchair enters in the direction identified by an arrow in FIG. 4, the right-hand sensor 190 which is preferably in the form of a light barrier device signals entry of the wheelchair and thereupon the control circuit 200 causes the rollers 140, 150 to rotate synchronously, and that movement, similarly to an escalator or travelator, moves the wheelchair into a cleaning position which is then detected by the central sensor 190.

After that position is reached the drive motor 230, producing a defined torque, will endeavour to rotate the rollers 140, 150. On the basis of the current which is fed to the dc motor 230 in that situation, by virtue of integration thereof over a defined period of time it is possible to establish whether the tires of the wheelchair are rotating with the definedly preset torque.

If the integrated current value assumes a value which exceeds a predetermined limit value, the control circuit 200 recognises that the tires of the wheelchair in the apparatus cannot be rotated and the wheelchair is consequently electrically driven.

Thereupon the control circuit 200 switches the drive motor 230 into a current-less state or into its freewheel condition. By means of a lamp 290 on the operating console 90, the wheelchair occupant is signalled that he has to switch on his wheelchair drive, for the cleaning operation.

If the integrated current value does not exceed the limit value, the control circuit 200 assumes that the wheelchair is a wheelchair which is propelled by hand and the motors 179, 230 and 255 are operated over a defined period of time until the wheelchair tires are completely clean. Experience has shown that a period of about 20 seconds and four complete wheel revolutions which are performed during that period are already sufficient for that purpose.

The end of the cleaning operation is indicated by a further lamp on the operating console 90. During the cleaning operation the first round brush 170 is rotated in the opposite direction to the wheelchair tire so that even dirt in the grooves or channels in the profile of the tire is reliably removed.

When the wheelchair is moving into and out of the cleaning apparatus however the first round brush is actuated in the same direction of rotation as the rollers 140, 150, to provide assistance in this respect.

Movement of the wheelchair out of the apparatus is initiated after termination of the cleaning operation and is assisted by rotation of the rollers 140, 150 and the round brush 170 in the exit direction.

In addition during the cleaning operation the torque of the motors 179, 235 and 255 is constantly monitored and they are switched off if it exceeds a predetermined limit torque. That both minimises the risk of injury to the wheelchair occupant and also prevents overloading of parts of the apparatus.

To ensure correct cleaning operation, the dc motors are of a servo-assisted nature and are actuated by the control circuit 200 in such a way as to be stabilised in respect of the speed of rotation.

As a further safety means, an emergency off switch of large area with which the apparatus can be instantly switched off is disposed preferably on the operating console 90.

So that the apparatus according to the invention can also be subsequently fitted in a stationary location, the dimension indicated at h in FIG. 7 is only 90 mm. It is thus possible to provide a suitable recess in the respective floor, for stationary mounting of the apparatus.

In an alternative embodiment the use of the run-on and run-off ramps 15 and 18 permits the apparatus according to the invention to be used at almost any location.

I claim:

1. A tire cleaning apparatus both for electrically driven and also hand-propelled wheelchairs comprising: at least two pairs of rollers (40, 50) which support at least one wheelchair tire (30), the pairs of rollers (40, 50) being arranged with respect to each other to accommodate tires of different diameters, wherein at least one roller (40) is drivable for rotating the tires (30) and is switchable into a freewheel condition, and at least one cleaning device (60) associated with at least one wheelchair tire (30).

2. A tire cleaning apparatus according to claim 1, further comprising a platform (10) and a trough (20) in the platform (10) for receiving the at least one wheelchair tire characterised in that a plurality of rollers (40, 50) are arranged in pairs at increasing spacings relative to each other in the trough (20) in the platform (10) in order to be able to accommodate tires of different diameters.

3. A tire cleaning apparatus according to claim 2 characterised in that each roller (40, 50) is selectively driveable and free-wheeling to produce a vertical force component which is directed towards the platform (10).

4. A tire cleaning apparatus according to claim 1 characterised in that the cleaning device (60) is a cleaning belt which is rotatable in opposite relationship to the direction of rotation of the rollers (40, 50) and which contacts the tire (30) at the lowermost tangent of the tire.

5. A tire cleaning apparatus according to claim 4 characterised in that each cleaning belt is composed of a plurality of brush segments (70) mounted movably on a drive chain (65).

6. A tire cleaning apparatus according to claim 5 characterised in that the brush segments (70) are of an elliptical cross-section and rotate about an axis of rotation which is perpendicular to an axis of rotation of the roller.

7. A tire cleaning apparatus according to claim 4 characterised in that associated with each tire (30) is a central cleaning device and two outwardly disposed cleaning devices relative to the central cleaning device (60) which are arranged along an axis of rotation of the roller at spacings relative to each other and displaced in respective height in such a way that the respective two outwardly disposed cleaning devices (60) are in a plane which is higher than that of the central cleaning device.

8. A tire cleaning apparatus of claim 1 characterised in that the cleaning device (160) is a first round brush (170) which rotates substantially in the opposite direction to the tire.

9. A tire cleaning apparatus according to claim 8 characterised in that the first round brush (170) is substantially cylindrical and is composed of a plurality of disc-shaped brush segments (171).

10. A tire cleaning apparatus according to claim 8 characterised by further second round brushes (180) which are held rotatably in such a way that rotation thereof results in a cleaning action in at least one of a sidewall region and a lower drain-off region of the wheelchair tire.

11. A tire cleaning apparatus according to claim 10 characterised in that the second round brushes (180) are so arranged that the brush segments (70) of at least two second round brushes (180) partially overlap in the inoperative condition at least when rotating and are thus self-cleaning.

12. A tire cleaning apparatus according to claim 10 characterised in that the cleaning devices (170, 180) associated with each tire (30) are designed to clean tires of different widths.

13. A tire cleaning apparatus according to one of claim 1 characterised in that there is provided an operating console (90) which can be reached from a wheel chair.

14. A tire cleaning apparatus according to claim 1 characterised in that the entry and exit movement of a wheelchair is detected by means of sensors (190) and the cleaning operation is triggered off by a control circuit (200) and is maintained for a period of time sufficient for the cleaning operation.

15. A tire cleaning apparatus according to claim 1 characterised in that drive torque of the rollers (40, 50; 140, 150) is monitored and when a torque limit value is exceeded at least one of the following occurs: the drive of the rollers is stopped and the freewheel mode thereof is switched on.

16. A tire cleaning apparatus according to claim 1 characterised in that at least some of the cleaning apparatuses (60, 160, 170, 171) and the rollers (40, 50; 140, 150) are mounted pivotably upwardly around a pivotal connection (260).

17. A tire cleaning apparatus according to claim 1 characterised in that a removable catch trough (100) is arranged beneath the cleaning devices (60).

18. A tire cleaning apparatus according to claim 1 characterised in that one part of the cleaning device (170) rotates parallel to the wheelchair tire (30) and another part of the cleaning device (180) rotates perpendicular to the one part.

* * * * *